Patented Apr. 27, 1943

2,317,385

UNITED STATES PATENT OFFICE 2,317,385

PLASTICIZATION OF SYNTHETIC RUBBER-LIKE MATERIALS

Albert Koch, Cologne-Dunnwald, and Erich Gartner, Leverkusen-I. G. Werk, Germany, assignors to Jasco Incorporated, a corporation of Louisiana No Drawing. Application March 19, 1941, Serial No. 384,210. In Germany March 20, 1937

6 Claims. (Cl. 260—86)

The present invention relates to a new process for improving the plasticity and softness of synthetic rubber-like materials prepared by the emulsion polymerization of butadiene-1.3 hydrocarbons or of mixtures of such butadienes with copolymerizable vinyl compounds, i. e. of compounds containing a single C=C linkage, and is a continuation in part of our application Ser. No. 196,903, filed March 19, 1938.

Synthetic rubber-like materials of the character described are distinguished from natural rubber by their being less thermoplastic in the unvulcanized state. This hardness may be such as to prevent the practical use of these polymerizates for many purposes. Moreover, particularly on exposure to air, these products are liable to undergo a further self-hardening which is probably due to a linking of the individual chains with the formation of cyclic compounds. Due to this phenomenon, which is hereinafter called "cyclicisation", the working of these products on the roller is connected with considerable difficulties and expenses and, moreover, the mechanical properties of the vulcanizates obtained therefrom are impaired. It is known that the said self-hardening can be prevented by certain additional substances; however, there was a lack of simple methods for reducing the undesired hardness which is inherent to such synthetic rubber-like polymerizates from the very moment of their formation.

It is the object of our present invention to develop a new process which allows one in a simple and economical manner to render these products more plastic without impairing the mechanical properties of the vulcanizates which are obtainable therefrom to any material extent. Another object of the present invention resides in the conversion of these polymerizates into a state of thermoplasticity similar to that of natural rubber so that these products can be worked in the manner and on the apparatus usually employed in the rubber industry.

With these and other objects in view our invention comprises exposing emulsion polymerizates of the character described to an oxidizing treatment in the presence of antioxidants, i. e. in the presence of such compounds as are capable of preventing the polymerizates from taking up of oxygen from the air which phenomenon is connected with the self-hardening process described above. This oxidizing treatment is effected at an elevated temperature, say at above about 80° C. or more. Our present invention is based on the observation that oxygen, if caused to react with such polymerizates, has a different effect, depending on whether such anti-oxidants are present or not. In the absence of anti-oxidants a further hardening, i. e. a phenomenon similar to vulcanization, is to be observed, whereas when working according to the present invention, i. e. in the presence of anti-oxidants and at an elevated temperature, there occurs the reverse effect, i. e. a softening of the products. It follows therefrom that the anti-oxidants must be present within the said synthetic rubber-like materials in an amount which is sufficient to prevent the latter from becoming cyclizised. Thus, in case oxidizing agents are present in the synthetic rubber, the amount of the anti-oxidants must be sufficient to counteract the former so that the synthetic rubber does not show any tendency to harden. The effect which is brought about by the above described process is the more surprising as natural rubber is completely broken down if exposed to such high temperatures for a prolonged time. The oxidizing treatment can be effected by simply milling or kneading these polymerizates in the presence of anti-oxidants thus allowing contact of every particle of the polymerizates with the surrounding air or oxygen; this process can be performed on heated rollers or in any other suitable apparatus. In case the polymerizates are present in form of thin sheets or in a powdery or crumbly state a sufficient softening effect can be reached by simply exposing the same to a high temperature, i. e. without any additional working, milling or kneading. The anti-oxidants can be incorporated within the polymerizates either in a solid state, for instance, on the roller, or by mixing both ingredients in a dissolved or dispersed state.

This invention may be applied to every emulsion polymerizate of butadiene-1.3 hydrocarbons, this term being intended to include also the polymerizates of homologues of butadiene such as isoprene and also mixed polymerizates of various butadiene hydrocarbons. Furthermore, there can be employed products of the conjoint polymerization of butadiene hydrocarbons and copolymerizable compounds containing a single C=C linkage. Examples for such compounds are styrene, acrylic or methacrylic acid esters or nitriles, unsaturated ketones such as methylvinylketone, fumaric acid esters or 1.1-dichloroethylene. Examples for suitable anti-oxidants are aromatic amines such as alkyl or arylnaphthylamines, alkyl or aryl amino-anthracenes, aldolnaphthyl-amines, diaryl - phenylene - diamines, furthermore alkylated phenols and the sulfides or polysulfides thereof (see the U. S. Patent No. 2,175,082 to Hagen, Dennstedt and Becker) and the products which are obtainable by causing acid catalysts to react upon aromatic vinyl compounds and aromatic hydroxy compounds (see the co-pending application Serial No. 125,434 to Rosenthal and Meis, filed February 12, 1937, now U. S. Patent 2,224,837 dated Dec. 10, 1940). These anti-oxidants are preferably employed in an amount of up to about 4% calculated on the amount of polymerizate. Depending on the nature and the amount of the anti-oxidants the temperature may vary within wide limits.

The following examples illustrate the present invention without, however, restricting it thereto the parts being by weight:

Example 1

Within a product of the conjoint polymerization in emulsion of butadiene and styrene there are incorporated about 1–3% of phenyl-$\beta$-napthylamine. The whole is then passed for about 10–15 times through a pair of rollers of a friction of about 1:1.5, the temperature of the rollers being kept at about 120° C.

According to another method of working the same mixture in a crumbly state is placed on a perforated dish and heated in a vessel to 130° C. at a superpressure of 3 atmospheres for about 40 to 80 minutes, care being taken that the air permanently circulates within the vessel.

In both cases there are obtained products which are distinguished from the starting materials by their increased softness and plasticity and, in consequence thereof, by their being better capable of taking up filling agents on the roller.

The same effect is reached when replacing the mixed polymerizate of butadiene and styrene by a mixed emulsion polymerizate of butadiene and acrylic acid nitrile.

Example 2

A crumbly mixed emulsion polymerizate of butadiene and styrene is heated at an overpressure in an autoclave for 60–90 minutes to 90–100° C. with the addition of about 2% of tertiary paraamylphenoldisulfide. When compared with the untreated mixed polymerizate the product thus obtained shows an increased plasticity and stickiness, the mechanical properties of the vulcanizates obtained therefrom being by no means impaired.

Example 3

To an emulsion of a mixed polymerizate of butadiene and styrene as is obtained by the conjoint polymerization of the components emulsified in an aqueous solution of an alkylated naphthalene sulfonic acid, there are added about 3% of isobutylphenoldisulfide; the whole is then thoroughly stirred with an emulsion of about 2–3% of benzoylperoxide in water and benzene with the addition of an alkylated naphthalenesulfonic acid. Thereupon precipitation is effected by the addition of electrolytes and acetic acid, whereby the coagulated mixed polymerizate is precipitated in a crumbly state having incorporated therewith in a fine distribution the said additions of anti-oxidants and oxidizing agents. The mixture thus obtained is dried and then heated in an autoclave for about 30 minutes to 90° C., care being taken, for instance by moving the air, that the crumbly coagulate does not form a coherent mass.

Example 4

To the emulsion of the mixed polymerizate as described in Example 3 there are added while stirring about 3% of methylphenoldisulfide, whereupon after precipitation the whole is heated in an autoclave for 5–10 hours to 100° while stirring and while exposing to air.

Example 5

The crumbly mixed emulsion polymerizate of butadiene and styrene obtained according to Example 3 is worked for 10–60 minutes in a kneading apparatus or a mixer of the Werner Pfleiderer type, the inner temperature of which is kept at about 140° C. Already after a few minutes the originally crumbly polymerizate is converted into a coherent mass which becomes more and more soft and plastic on working.

Example 6

A mixed emulsion polymerizate of about 75 parts of butadiene and about 25 parts of acrylic acid nitrile having incorporated therewith 3% of phenyl-$\beta$-naphthylamine, is heated as described in Example 2 for 60–180 minutes to 130–140° C. while exposing to air under a pressure of 3 atmospheres. The product thus obtained is distinguished from the untreated product by its increased plasticity and viscosity.

Example 7

20 parts of an oily condensation product of 104 parts of styrene and 94 parts of phenol obtained according to the process of the co-pending application Serial No. 125,434 filed February 12, 1937, (now U. S. Patent 2,224,837) are dissolved in 50 parts of an indifferent solvent such as benzene. This solution is spread onto a thin sheet (2 mm. thickness) of a butadiene-styrene emulsion polymerizate containing 3% of phenyl-$\beta$-naphthylamine, in such an amount that the polymerizate has incorporated therewith 1% of the oily condensation product. The sheet thus treated is heated for 30 minutes in a drying apparatus to 120–130° C. while allowing free access of air. Thereby the product is rendered transparent and shows an increased plasticity when working it up into vulcanization mixtures.

The condensation products of vinyl benzenes and phenols can also be added to the synthetic latex and then precipitated simultaneously therewith.

Example 8

100 parts of an emulsion-mixed polymerizate from 75 parts of butadiene and 25 parts of styrene having incorporated therewith 3 parts of $\alpha$-phenyl-naphthylamine as anti-oxidant are heated to 130° C. at an overpressure of air of 3 atmospheres for 60 minutes. The plasticity of the starting material measured as described by Harro Hagen in "Kautschuk" volume 15, pages 88–95 was about 5000 whereas the product having undergone the said heat treatment showed a plasticity of about 700.

In case the $\alpha$-phenyl-naphthylamine is replaced by the same amount of $\beta$-ethyl-phenyl-naphthylamine there is obtained a product of the plasticity 1500. In the case of the use as anti-oxidant of 4-phenylaminodiphenylamine-thiourea the plasticity 1500 has been reached whereas the use of tertiary isobutyl-phenol-sulfide has resulted after an 80 minutes' treatment at 115° C. and at an overpressure of 3 atmospheres in a plasticity of about 800.

Example 9

An emulsion-mixed polymerizate from 10% of styrene and 90% of butadiene having incorporated therewith 2.5% of phenyl-β-naphthylamine shows a plasticity of about 7300 and, after a 180 minutes heating to 130° at an overpressure of 3 atmospheres, a plasticity of about 650.

Example 10

In an acid aqueous emulsion there has been prepared a mixed polymerizate from 75 parts of fumaric acid diethylester and 25 parts of butadiene which after the incorporation therewith of 2% of phenyl-β-naphthylamine showed a plasticity of about 650. After a 180 minutes' heating to 130° in a current of air the plasticity of about 520 has been reached.

Example 11

70 parts of butadiene and 30 parts of acrylic acid butylester have been emulsified in 200 parts of water having dissolved therewith 4 parts of sodium isobutylnaphthalenesulfonate, 0.3 part of ammoniumpersulfate, 2.5 parts of sodium linoleate and 0.35 part of sodium pyrophosphate. The emulsion has been stirred at 42° C. until a yield of polymerizate of about 70% has been reached. Thereupon 3 parts of phenyl-β-naphthylamine in form of an aqueous emulsion have been added thereto and the whole has been coagulated in the usual manner. After drying a product has been obtained the plasticity of which was about 4750 whereas after a 90 minutes' heating to 130° C. in a current of air a plasticity of about 925 has been reached.

Example 12

5 parts of vinyl methylketone and 50 parts of butadiene have been subjected to an emulsion polymerization in an acid medium while employing dodecylamine hydrochloride as emulsifier. As soon as a yield of polymerizate of about 80% has been reached, the emulsion has been stabilized by the incorporation therewith of 3% of phenyl-β-naphthylamine. By a 120 minutes' heating to 130° C. in a current of air the plasticity of this product can be reduced from about 2000 to about 500.

Example 13

25 parts of methacrylic acid methylester and 25 parts of butadiene have been subjected to an emulsion polymerization in an alkaline medium. After the incorporation within the synthetic latex thus obtained of 3% of phenyl-β-naphthylamine a product has been reached which shows the plasticity 6150 whereas after a 60 minutes' heating in a current of air to 130° the plasticity 1400 has been reached.

We claim:

1. The process which consists in subjecting synthetic rubber-like materials selected from the group consisting of emulsion polymerizates of a butadiene-1.3 hydrocarbon, emulsion copolymerizates of mixtures of butadiene-1.3 hydrocarbons and of emulsion copolymerizates of butadiene-1.3 hydrocarbons with copolymerizable compounds containing a single vinyl group to an oxidizing reaction with free oxygen at elevated temperatures of above about 80° C. in contact with up to about 4% of anti-oxidants thereby substantially improving the plasticity and softness of said materials.

2. The process which consists in subjecting synthetic rubber-like materials selected from the group consisting of emulsion polymerizates of a butadiene-1.3 hydrocarbon, emulsion copolymerizates of mixtures of butadiene-1.3 hydrocarbons and of emulsion copolymerizates of butadiene-1.3 hydrocarbons with copolymerizable compounds containing a single vinyl group to an oxidizing reaction with free oxygen at elevated temperatures of from about 80 to about 140° C. in contact with up to about 4% of anti-oxidants thereby substantially improving the plasticity and softness of said materials.

3. The process which consists in subjecting synthetic rubber-like materials prepared by the conjoint emulsion polymerization of butadiene-1.3 hydrocarbons and styrene to an oxidizing reaction with free oxygen at elevated temperatures of from about 80 to about 140° C. in contact with up to about 4% of anti-oxidants thereby substantially improving the plasticity and softness of said materials.

4. The process as claimed in claim 1 wherein the anti-oxidant is an arylnaphthylamine.

5. The process as claimed in claim 3 wherein the anti-oxidant is an arylnaphthylamine.

6. The process which consists in subjecting synthetic rubber-like materials selected from the group consisting of emulsion polymerizates of a butadiene-1.3 hydrocarbon, emulsion copolymerizates of mixtures of butadiene-1.3 hydrocarbons and of emulsion copolymerizates of butadiene-1.3 hydrocarbons with copolymerizable compounds containing a single vinyl group to an oxidizing reaction with free oxygen at elevated temperatures of from about 80 to 140° C. in contact with anti-oxidants, thereby substantially improving the plasticity and softness of said materials, the amount of the anti-oxidants being sufficient to prevent the synthetic rubber-like materials from becoming cyclicized.

ALBERT KOCH.
ERICH GARTNER.